Figure 1:
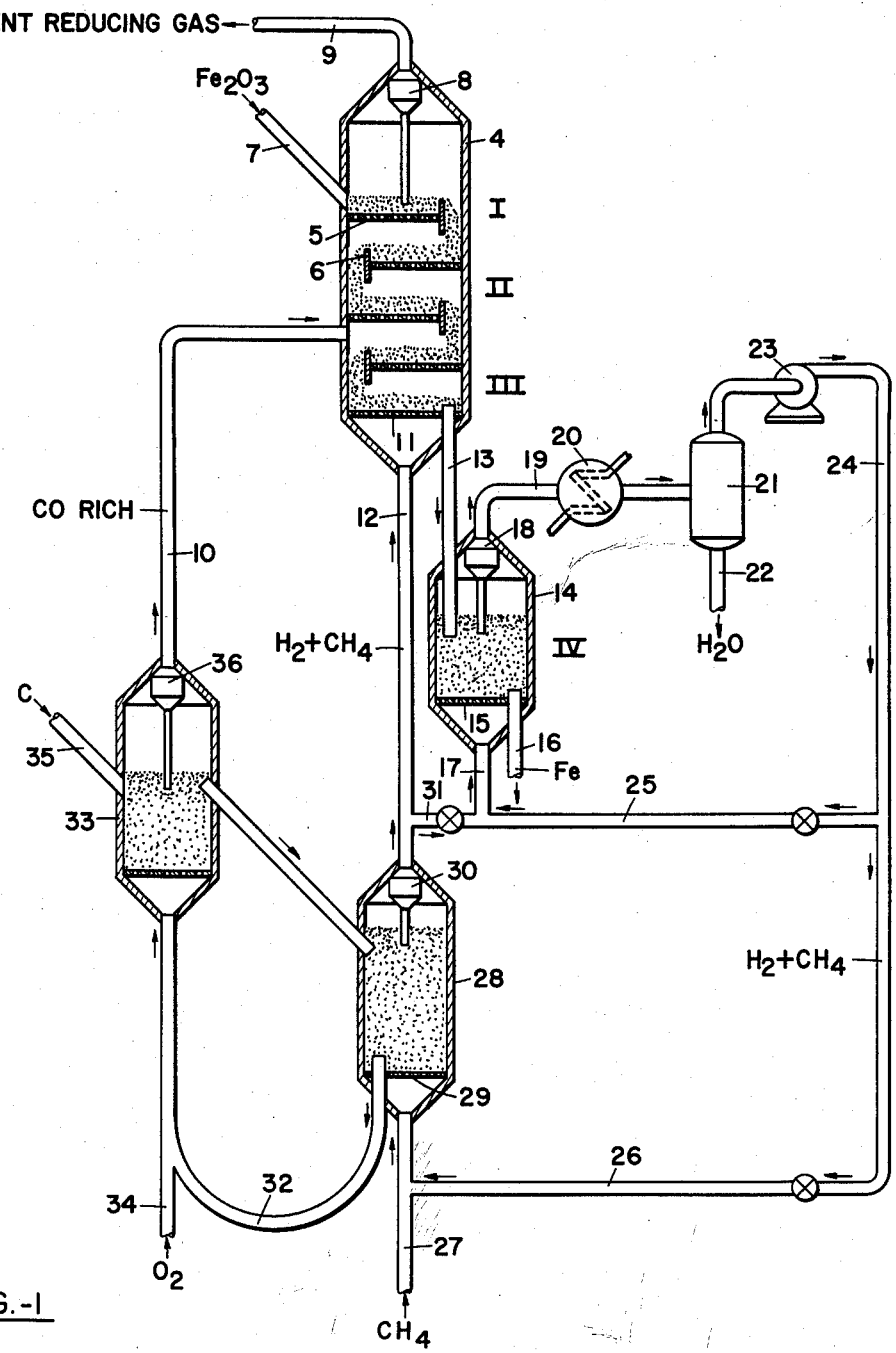

Charles E. Hemminger  Inventor
By Henry Berk  Attorney

United States Patent Office 3,076,702
Patented Feb. 5, 1963

3,076,702
IRON OXIDE REDUCTION IN STAGES WITH VARIED GAS STREAMS
Charles E. Hemminger, Westfield, N.J., assignor to Esso Research and Engineering Company, a corporation of Delaware
Filed Dec. 30, 1958, Ser. No. 783,830
10 Claims. (Cl. 75—26)

This invention relates to a process for reducing ore and oxides of iron in stages with reducing gases of varied compositions, and to the preparation of these gases as separate streams.

For some time past, efforts have been made to reduce fluidized iron oxide particles with reducing gases containing $H_2$, CO, and gaseous hydrocarbons. Progress has been made in development as shown by the U.S. Patent 2,711,368 of W. K. Lewis. An object of the present invention is to make this kind of process more attractive.

In the reduction of the solids having changing proportions of iron oxides at various stages of reduction, there are numerous factors, e.g., temperature, entering gas composition, reactivity, composition of the solids, and oxidized gas composition that have an effect on the efficiency and utilization of the gases. For example, when a solids mixture containing $Fe_2O_3$ and FeO is undergoing reduction, said mixture having an O/Fe atom ratio in the range of 0.8 to 1.5, less reducing potential is needed in the reducing gas. It will be noted that in such mixtures the $Fe_2O_3$ has an O/Fe ratio of 1.5 and FeO has an O/Fe ratio of 1.0. When the mixture is reduced so that the O/Fe ratio is less than 1.0, such a mixture containing FeO and Fe, much care has to be taken to prevent concentrations of oxidizing gases ($CO_2$ and $H_2O$) from lowering the reduction action. When FeO is being reduced by a mixture of CO and $H_2$ at 800° to 900° C., only about 30% of this gas is useful because the $H_2O$ and $CO_2$ formed can reverse and stop reduction. When the reducing gas is a hydrocarbon or mixture of $H_2$ and hydrocarbon even more care is needed to prevent localized small concentrations of $CO_2$ and $H_2O$.

Another important consideration is that the CO can be utilized to more advantage than $H_2$ under a certain set of conditions, e.g., higher temperature, when the O/Fe ratio is in the region of 0.8 to 1.5 or in the region of 0.1 to 0.3, and if carbon is present. On the other hand, it is desirable to keep the hydrogen reducing gas as free as possible from CO and $CO_2$ in a reduction stage for recovery of the hydrogen by removal of $H_2O$.

In accordance with the method of the present invention, the gaseous media to be contacted with the solids ($Fe_2O_3$, $Fe_3O_4$, FeO, Fe) at different stages are produced separately and the resulting gaseous reaction products are treated separately. Therefore, CO rich, $H_2$ rich, and hydrocarbon rich gas streams are produced separately for separate introduction at stages where they are most effective.

To produce the separate $H_2$ rich stream, hydrocarbon, e.g., methane or other hydrocarbon material, is cracked over a suitable catalyst to form hydrogen and carbon deposits at elevated temperatures in the range of 600° to 1200° C. For example, the $CH_4$ is cracked at 750° to 1000° C. over an alumina supported cobalt molybdate catalyst. The carbon is collected on the catalyst while the hydrogen passes out of the reactor. This hydrogen rich stream is supplied to a final reduction stage where the O/Fe ratio is in the region of 0 to 0.8.

The CO gas stream is produced by burning the carbon deposits from the catalyst with oxygen. Using the carbonized catalyst, the oxidation of the carbon is carried out at 650° to 1100° C. with air which may or may not be enriched by $CO_2$. During the combustion of the carbon on the catalyst or solids, heat is added to the solids and used for subsequent decomposition of the gaseous hydrocarbon. The CO rich stream generated is preferably contacted with an FeO-Fe mixture having an O/Fe ratio in the region of 0.8 to 1.5 at temperatures of 750° to 850° C.

Third and fourth separate gas streams may also be prepared for use in stages of the reduction, one of these being high temperature gaseous hydrocarbon and the other high temperature partially combusted hydrocarbon containing CO. For the preparation of these separate streams a dual vessel system is useful, one vessel containing hot fluidized refractory solids for preheating the gaseous hydrocarbon to at least 800° C. and the other for partial combustion of gaseous hydrocarbon with $O_2$, also for burning carbon deposits on said solid at 900° to 1000° C., using oxygen or air preheated to temperatures of 900° to 1200° C.

For efficient use of the separate reducing gas streams, the overall iron oxide reduction process is divided generally into at least four distinct reduction stages. In a first stage the $Fe_2O_3$ is made to undergo reduction to FeO with a gas containing CO and $H_2$ but predominantly CO which may also contain $CO_2$ and $H_2O$. In this first stage a temperature of 750° to 900° C. may be used. Part of this first stage reduction can be carried out with addition of high temperature CO rich gas in order to raise the temperature of the FeO mixture to within the range of 750° to 900° C. as the $Fe_2O_3$ forms FeO. In the second stage, the FeO-$Fe_2O_3$ taken from the first stage becomes mixed with sufficient Fe formed by reduction to make the O/Fe ratio of said mixture from 0.8 to 0.3. The reducing gas stream for the second stage may be a hydrogen rich gas or a hydrocarbon rich gas with temperatures at 800° to 1000° C. The gas stream for the second stage is beneficially rich in hydrocarbon for effecting most of the reduction of FeO to Fe. Following the second stage may be used one or two clean-up stages for bringing the O/Fe ratio down below 0.3. If two clean-up stages are used, a CO-rich stream may be employed while the O/Fe ratio is in the range of 0.3 to 0.1. Finally a hydrogen rich gas is used in the final clean-up.

The manner in which the varied gas streams are used in the several distinct stages of reduction will be described in detail with reference to the flow plan in the drawing.

In the drawing FIG. 1 illustrates the flow plan for producing two main reducing gas streams which are used in a four-stage reduction operation, one of the main reducing gas streams being rich in CO and the other being rich in hydrogen or a mixture of hydrogen with hydrocarbon.

Figure 2:
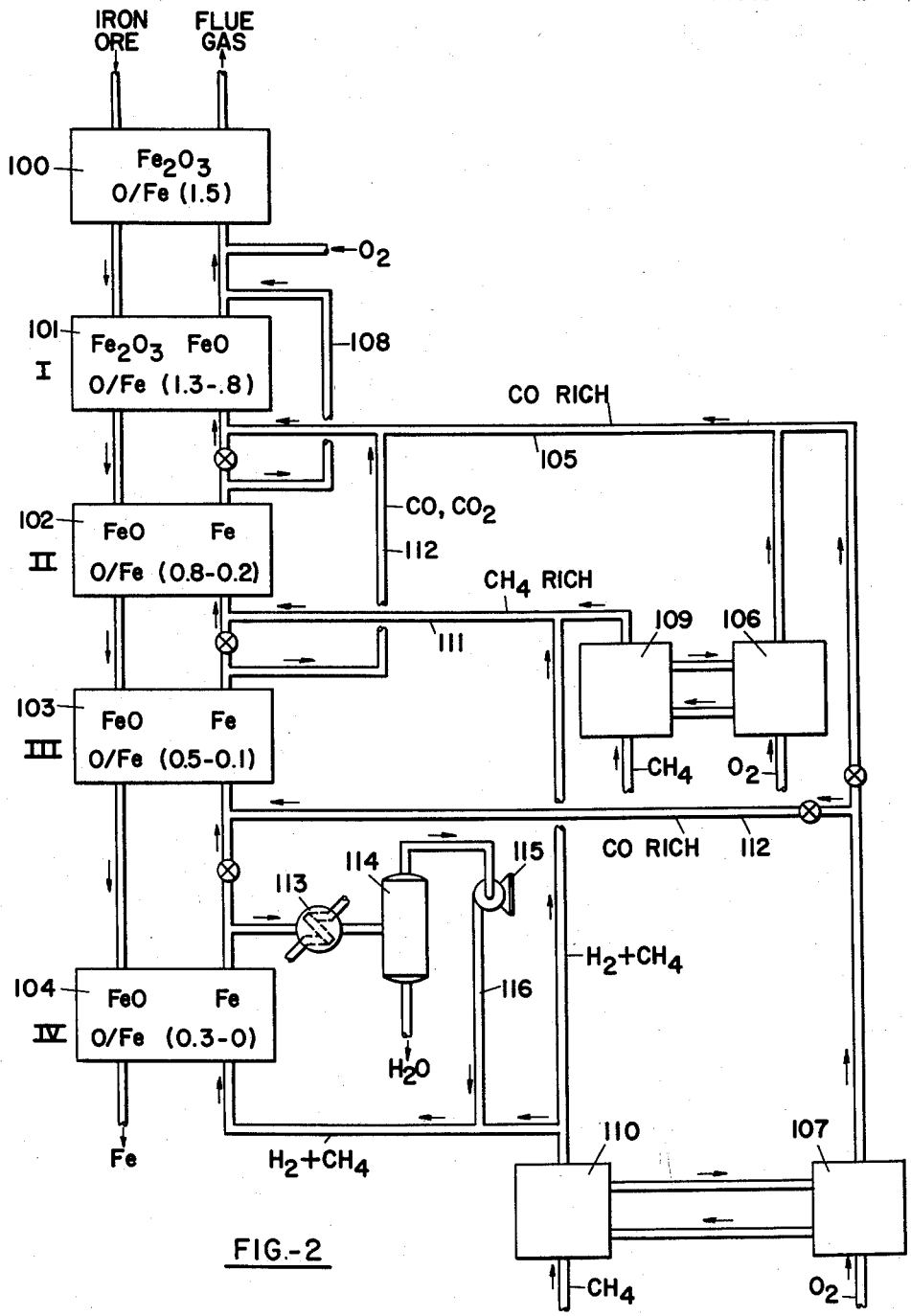

In FIG. 2 is shown a flow plan modification for illustrating how more than two reducing gas streams of difficult character can be used in an operation involving at least four distinct reduction stages.

Referring to FIG. 1, the initial stages of reduction and the main stage of reduction is carried out in vessel 4. This vessel is equipped with perforated trays 5 that permit reducing gases to flow upwardly through beds of fluidized solids which build up on each of the trays and then overflow end weirs 6. Thus, the fluidized solids containing the iron oxide at different stages of reduction flow generally countercurrent from the upper trays to the lower trays in succession. The depth of fluidized solids bed on each tray may be about 1 to 3 feet. The number of trays may be varied according to the capacity of the vessel and the extent of reduction required in each of the stages of reduction. The fluidized $Fe_2O_3$ particles are introduced into the top tray of vessel 4 from an inlet line 7 for contact with rising partially spent reducing gases, including CO, $H_2$, $CO_2$ and $H_2O$ at 750° to 850° C. The particles $Fe_2O_3$ very readily undergo reduction to FeO even though the CO to $CO_2$ mol ratio is not much more than 2:1 and the $H_2/H_2O$ is not much more than 2:1. The final spent reducing gas is withdrawn through a separator 8 and passed by line 9 to a unit where the spent gas can be used for combustion to preheat the iron ore.

High temperature CO rich gas is introduced into an intermediate part of vessel 4 from line 10, this stream having been prepared as will be further described by combustion of coke or carbonaceous deposits and, if desired, by combustion of additional carbonaceous material having a high carbon to hydrogen ratio using a limited amount of oxygen in order to form CO with relatively small amounts of $CO_2$ and $H_2O$. This CO rich stream having a suitably high temperature, e.g., 900° to 1200° C., effects some of the reduction of the $Fe_2O_3$ particles and imparts heat to these particles which then flow down to one or more lower trays beneath the point at which the CO rich gas stream is introduced. On the bottom tray or trays and above the grid 11 the fluidized solids composed mainly of Fe particles with a proportion of FeO particles to make the O/Fe ratio for the mixture in the range of 0.8 to 0.3 are contacted with the gas rich in hydrogen and gaseous hydrocarbon, e.g., methane, introduced by line 12 at a temperature of 750° to 1100° C. The manner in which this hydrogen and hydrocarbon rich gas is prepared will be further explained.

The Fe/FeO solids mixture is withdrawn from the bottom tray or grid 11 through line 13 into a clean-up reduction reactor 14. In the reaction vessel 14 the fluidized solids containing principally Fe particles with a small amount of FeO undergoes reaction with hydrogen rich gas even if the temperature is in a lower range of 600° to 850° C. The fluidized solids then form a bed on a grid 15 in vessel 14. The finally reduced particles are withdrawn through line 16. The reducing gas containing substantial amount of hydrogen is supplied to vessel 14 from line 17. The used reducing gas which leaves the fluidized solids bed in vessel 14 is removed through a separator 18 then passed through a cooling and a water condensate separation unit for recovery of unused hydrogen and hydrocarbon, the cooler being indicated as heat exchanger 20 and the separator 21 having a water removal line 22. Further reduction in water content may be effected by conventional alumina dryers not shown. The gas freed of water is made to flow by compressor 23 through line 24. This stream of recovered reducing gas may be sent to other parts of the system but is preferably recycled to parts of the system where high hydrogen concentration is desired. For instance, the recovered gas may be in part returned to vessel 14 by line 25. This gas may be returned by line 26 to a zone where the hydrocarbon is subjected to heating under cracking or dehydrogenating conditions.

To prepare the reducing gas stream rich in hydrogen and hydrocarbon, gaseous hydrocarbon, such as natural gas or other gases having a high content of normally gaseous hydrocarbons, e.g., methane, ethane, etc., is fed from line 27 into a vessel 28 containing a bed of fluidized refractory solid which may carry a suitable cracking catalyst, this bed being supported on a grid 29. The gaseous hydrocarbon is preferably preheated to an elevated temperature, e.g., in the range of 400° to 700° C.

Although the feed hydrocarbon to vessel 28 is preferably gaseous aliphatic hydrocarbons, such as methane, various petroleum fractions may be used.

The refractory solids that may be employed to aid the cracking and receive deposits of carbon or coke include materials, such as alumina, zirconia, magnesia, silica, silica-alumina, clays, coke, etc. Such materials in various active adsorbent forms making them suitable as catalyst supports may be used with various catalytic compounds, such as oxides or sulfides of heavy metals, e.g., molybdenum, cobalt, nickel, iron, tungsten, chromium, platinum, titanium, etc. Mixtures of metal oxides are also suitable. A particularly useful catalyst is a mixture of cobaltous and molybdic trioxide, which is, in general, known as cobalt molybdate. The oxides may be present in varying proportions. The catalyst may form 1 to 30 parts by weight of the cobalt molybdate, may be on 100 parts by weight of the support, e.g., gamma alumina.

The pressures in the cracking reaction may range from 0 to 1000 pounds per square inch gage, preferably 0 to 200 p.s.i.g.

A suitable feed rate of the hydrocarbon is 100 to 1000 volumes of gaseous hydrocarbon per volume of catalyst per hour. The amount of hydrogen formed is variable with the conditions and the kind of hydrocarbon cracked. Product gases obtained under optimum conditions may contain up to 95% hydrogen with the remainder unreacted hydrocarbon. This product gas is withdrawn from vessel 28 through a solids separator 30 to be passed as the hot reducing gas stream through line 12 into contact with the Fe-FeO mixture indicated to be undergoing a third stage reduction on the lowest trays in vessel 4. A portion of this cracked hydrocarbon gas is passed through line 31 into the clean-up reduction stage carried out in vessel 14. In these third and fourth stages of reduction the O/Fe ratio is lowered from 1 down to near 0. It has been found that to use the hydrocarbon effectively in this reducing gas stream it should be as low as possible in oxidizing gas content, i.e., with negligible amounts of $CO_2$ and $H_2O$ present.

The solids carrying deposited carbon are transferred from the fluidized solids bed in vessel 28 through line 32 into the CO rich gas generator 33. Preheated oxygen or air from line 34 is passed into vessel 33 where the solids form a fluidized solids bed above grid 34. The oxygen is supplied in controlled amount to effect the reaction of 0.5 mol oxygen per atom of carbon in order to form CO with a minimum of $CO_2$ and of $H_2O$. High carbon content carbonaceous material, such as coke, heavy petroleum oils, or the like, may be supplied to vessel 33 from line 35 to furnish more carbon for the reaction. Higher concentrations of CO are made by adding $CO_2$ to the oxygen stream if the $CO_2$ is available from other sources.

In generating the CO rich gas by reaction of carbon with oxygen suitable temperatures are in the range of 750° to 1200° C. The resulting high temperature gas product is withdrawn through a solids separator, such as a cyclone 36, to be passed by line 10 into intermediate reduction stage of vessel 4 where the high temperature CO rich gas adds to the reducing effect of the gases passing up through vessel 4 and impart heat and higher temperatures to the downflow mixture of iron oxide.

It is to be noted that a number of reduction stages can be carried out in the single vessel 4. In the uppermost tray or trays of the initial stage I the entering metal oxide which may be preheated ore ($Fe_2O_3$) is contacted with partially spent reducing gas that contains CO, $H_2$, $CO_2$, and $H_2O$, also $N_2$ if air is used in the burning of the carbonaceous deposits within vessel 33. There may also be present some small amount of unreacted hydrocarbon. In this initial stage the $Fe_2O_3$ is easily reduced to FeO even if the proportion of $H_2O$ and $CO_2$ is fairly high. In the intermediate stage II the hot CO rich gas increases the proportion of CO to $CO_2$ and in this stage the $Fe_2O_3$ is sufficiently reduced to make the mixture have a O/Fe ratio in the region of 0.8 to 1.3. In the subsequent stage III on the bottom plates the hydrocarbon is most effective when the solids mixture contains FeO with Fe giving a O/Fe ratio in the range of 0.8 to 0.2 and preferably between 0.8 and 0.3. The reaction in stage II wherein substantial amounts of CO are present is made more exothermic as the concentration of CO is increased and this is helpful for supplying the heat needed in stage III.

While in FIG. 1 is shown an apparatus arrangement illustrating how the initial stages can be put together in a single vessel, it is to be understood that the stages may be carried out in separate vessels or compartments so as to permit finer control of the reducing gas compositions entering and leaving each of the stages. A method of carrying out the process with finer controls of the varied gas streams is illustrated in the flow plan of FIG. 2.

In FIG. 2 is shown how the iron ore is heated in the preheater zone 100 by supplying spent reducing gas from subsequent reduction stages and oxygen for combustion of residual combustible components, e.g., CO, $H_2$ and hydrocarbon. The iron oxide flows through the successive reduction stages 101, 102, 103, and 104. More of such stages may be used, if desired, for the purpose of making more effective use of the different separately produced reducing gas streams. These streams can be produced in one or more gas generated vessels. For example, a carbon monoxide rich stream that is particularly useful in an initial or intermediate reduction stage can be supplied through line 105 from a partial combustion generator 106 or generator 107, or from both. In these generators carbon is burned with limited amount of oxygen at high temperatures, the oxygen or air being preferably preheated to maintain a high partial combustion temperature. If it is desired to make most effective use of the reaction of CO with the iron oxides, partially spent reducing gas from a subsequent reduction stage zone 102 may be by-passed around the stage where the CO rich gas is used, as, for example, through the by-pass 108.

The reducing gas which is most suitable on a mixture of FeO and Fe having an O/Fe ratio 0.8 to 0.3 is a hydrocarbon containing gas; but for satisfactory reduction with the hydrocarbon containing gas, this gas should be as free as possible of $H_2O$ and $CO_2$. The reaction temperature should be in the range of 700° to 1000° C., and the FeO-Fe mixture should be supplied with adequate amount of heat. A hydrocarbon rich stream for this purpose can be made in the generator 109 or generator 110, or both. With adequate heat available in this stage, supplied hydrocarbon need not be cracked but only preheated. The hydrocarbon cracking generators can be operated in the manner described with reference to vessel 28 in FIG. 1. It is possible to operate generator 109 under conditions to obtain a high temperature heating of the gaseous hydrocarbon without forming high amounts of hydrogen. Then, if desired, the generator 110 may be operated to produce a gas that is richer in hydrogen. The hydrocarbon and hydrogen containing gases supplied through line 111 to the stage II zone which is by-passed by any reducing gas stream containing substantial amount of $CO_2$ or $H_2O$. Accordingly, the partially spent reducing gas from the subsequent stage III may be sent through the by-pass line 112 for use in an earlier stage.

In stage III opportunity for lowering the amount of carbon or graphitization with some further reduction of FeO is provided by using carbon monoxide rich gas which flows through line 112 from the partial combustion gas generator 107. This stage is used in the event that FeO is not fully reduced to Fe and substantial amounts of carbon become deposited in the prior stage which employs hydrocarbon as a reducing agent.

For a final clean-up of FeO mixed with the metalized product in zone 104 of stage IV a high hydrogen content reducing gas stream is preferred. In using such gas the reduction temperature in the range of 550° to 650° C., i.e., relatively low compared to the temperatures in the preceding reduction stages, there is a special benefit in using a reducing gas which forms negligible amounts of carbon in this final stage since it is desirable to recover hydrogen from the used reducing gas leaving stage IV and to recycle the recovered gas, as shown. The recycled gas may be passed through a cooling unit 113 and water separating unit 114 in which water condensate is removed and the gas is then passed by a compressor 115 through line 116 back to the stream of reducing gas rich in hydrogen from the gas generator 110. The recycled gas freed of water also may be passed entirely or in part through the generator 110 as indicated in FIG. 1. Additional drying of the recycle hydrogen gas can be obtained in a conventional alumina or similar drier not shown.

While basically each of the reduction stages is operated with a separately prepared gas stream entering into contact with the solids mixture, some flexibility is permitted in preparing effluent reducing gas from one stage to a preceding stage. For example, some of the hydrogen gas from the final stage IV can be passed into stage III; or, if desired, stage III can be combined with stage IV using the effluent from stage IV in stage III in place of the CO rich gas from line 112, in which event the gas effluent from stage III may be recycled through the water removing system. However, it is of particular importance to avoid supplying the stage where hydrocarbon is the principal reducing agent with gas containing any substantial amount of $CO_2$ and $H_2O$. There is also the feature of the arrangement shown which permits the use of the CO rich gas under high temperature conditions which make the CO more effective without causing carbon deposition and graphitization.

In contrast to a process which depends mainly on the partial combustion of the hydrocarbon for obtaining a stream which contains hydrogen, carbon monoxide, unreacted hydrocarbon, some $CO_2$ and $H_2O$ the presently described process can be used with a considerable saving in total amount of gaseous hydrocarbon consuming time.

The following example illustrates the relative quantities of materials employed in conducting the operation in stages with the selected separately formed reducing gas streams.

*Example*

A hydrogen rich reducing gas stream containing 94% hydrogen is formed in an amount of 6000 standard cubic feet (s.c.f.) from 3400 s.c.f. of natural gas at 800° C. to be supplied to a final clean-up stage. Effluent gas from the final clean-up stage contains 1 mol of $H_2O$ to 3 mols of hydrogen and thus permits recovery of up to 4000 s.c.f of hydrogen by recycling. In a preceding reduction stage where the FeO-Fe mixture is maintained at a O/Fe ratio in the region of 0.3 by a supply of preheated methane at a temperature of 850° C. from 1.5 to 2.0 atoms of oxygen are removed from the FeO per mol of $CH_4$ thus requiring a feed rate of 5000 s.c.f. of the preheated methane for 2000 pounds of iron ore. Carbon obtained from the cracking of the methane undergoes combustion with air to form the CO rich stream containing 35% CO which is passed into a reduction stage preceding the stage where the methane is the reducing reactant. The partially spent reduced gases from the three mentioned reduction stages are mixed with air to obtain a heating gas for raising the temperature of the iron ore charge to 600° C. The total methane consumption per ton of the ore which is 98.3% $Fe_2O_3$ is indicated to be 13,400 s.c.f. per ton whereas if the methane were used only with partial combustion this figure is estimated to be at least 20,000 s.c.f. per ton of the ore.

Since in general, an initial roasting or preheating is desirable, all sorts of ores can be used as starting materials, e.g., hematite (chiefly $Fe_2O_3$), limonite

$(2Fe_2O_3 \cdot 3H_2O)$ magnetite ($Fe_3O_4$), siderite and roasted pyrites. Principles of the invention are useful for reduction of other metal oxides reducible by the reducing gases described, e.g., copper oxides, nickel, cobalt, etc.

In the initial reduction stage the metal oxides more readily give up oxygen and can be reduced by partly spent reducing gases containing $CO_2$, $H_2O$, and $H_2$ with $H_2$, CO, and hydrocarbon relatively low temperatures of 500° to 850° C. The $Fe_2O_3$ reduces to FeO and $Fe_3O_4$.

As the reduction is made to proceed further the reducing components have to be used in higher concentration.

The further reduction which becomes more difficult raises questions as to the reducing agent that is more efficient at a certain stage, the conditions of its use, and its preparation.

In a stage where the mixture of partly reduced metal oxide has a composition similar to $Fe_3O_4$ or equal amount of $Fe_2O_3$ with FeO, i.e., with an O/Fe of about 1.3 down to about 1 or 0.8 corresponding to FeO with little Fe, CO gas is a good reducing agent. The CO gas may be prepared by burning carbon with air so that 60 to 70% of the gas is nitrogen. As the $CO_2$ formed becomes higher than the CO concentration, the gas loses effectiveness. However, the CO gas is particularly effective at elevated temperatures of 850° to 1000° C. and imparts heat to the solids by its exothermic reduction reaction, especially if other reducing gases are not present in substantial amount. Thus, the CO gas reduction acts well in removing about 2 to 5 weight percent of oxygen from the mixed oxides in the O/Fe range stated.

Use of a hydrocarbon reducing gas involves several factors. The hydrocarbon, e.g., methane, ethane, propane, propylene, etc., in reducing acts very slowly on FeO, as the O/Fe is decreased below 0.8 it begins to act more rapidly up to where the O/Fe is about 0.3. The reaction goes well at 800° to 950° C. but heat has to be added. Therefore, it is desirable to admix higher temperature FeO to the FeO-Fe mixture using a hydrocarbon gas stream of higher temperature. The hydrocarbon gas reduces best when it has present a minimum of $CO_2$ and $H_2O$. It appears to act best also when CO and $H_2$ are at a minimum since these gases are more speedy competitors and form $CO_2$ and $H_2O$.

CO gas can again be used following the hydrocarbon gas treatment at 800° to 1000° C., especially if there are some carbon deposits brought into the CO treating zone.

For a final clean-up, hydrogen reducing gas is particularly useful. This gas may contain some hydrocarbon which does not act effectively for reducing FeO at O/Fe of less than 0.3. The hydrogen forms $H_2O$, and if CO and $CO_2$ are kept at a minimum or in negligible proportion, the gas leaving the hydrogen gas treating zone can be made free of $H_2O$ and reused. The hydrogen gas is effective at relatively low temperatures of 550° to 650° C.

The invention described is claimed as follows:

1. A process for reducing finely divided iron oxides, which comprises partly reducing $Fe_2O_3$ to FeO in an initial stage with hot partly spent reducing gas from a subsequent stage, passing a portion of partly reduced iron oxides from the initial stage to a second stage, further reducing and heating said partly reduced iron oxides in the second stage with hot reducing gas containing CO as the predominant reducing agent at a higher temperature to obtain FeO of increased temperature, passing the thus obtained FeO from the second stage to a third stage in which it is reduced partly to Fe by contact with a hot reducing gas predominantly hydrocarbon, subsequently reducing FeO in a mixture with Fe withdrawn from said third stage in a final stage with reducing gas predominantly hydrogen mixed with gaseous hydrocarbon.

2. A process as defined in claim 1, in which between the third stage and final stage the mixture of Fe-FeO is treated with hot CO gas.

3. A process of reducing fluidized iron oxides in stages with separate reducing gas streams of CO and hydrocarbon, which comprises contacting a mixture of iron oxides having an atomic O/Fe ratio between about 1.25 and 1.0 with a hot reducing gas stream in which CO is the predominant reducing component at about 850° to 1000° C., admixing a resulting portion of fluidized particles that are predominantly FeO with Fe particles in a succeeding reduction zone to establish a fluidized FeO-Fe mixture having an atomic O/Fe ratio between about 0.8 and 0.2, passing into said FeO-Fe mixture at about 800° to 950° C. a hot reducing gas stream in which hydrocarbon is the predominant reducing component, and withdrawing from said succeeding zone a mixture of FeO and Fe particles.

4. A process for reducing finely divided iron oxide in stages, which comprises preparing a hot reducing gas stream of hydrogen and hydrocarbon by cracking hydrocarbon at an elevated temperature in a fluidized bed of solids to form hydrogen and carbon deposit on the solids in a cracking zone, forming a separately prepared hot stream of carbon monoxide of higher temperature than said stream of hydrogen and hydrocarbon by reacting the carbon deposit on the solids with oxygen, reacting finely divided iron oxide with said separately prepared hot stream of carbon monoxide in a reduction stage so that said iron oxide is reduced to particles of lowered oxygen content and is heated, thereafter admixing said particles of lower oxygen content and thus heated from said mentioned stage with fluidized particles of ferrous oxide and metallic iron to make a solids mixture of lowered oxygen content in a subsequent reducing stage zone, contacting the mixture of particles in said subsequent zone with said hot reducing gas stream of hydrogen and hydrocarbon which is passed into contact with said particles with negligible amounts of water vapor, carbon monoxide and carbon dioxide, withdrawing from said subsequent reduction zone partly spent reducing gas containing unreacted hydrocarbon, hydrogen, and $H_2O$ vapor formed by reduction reaction with negligible amount of CO and $CO_2$, separating $H_2O$ from said withdrawn gas and passing said withdrawn gas from which $H_2O$ is separated into said cracking zone for heating the gas and cracking hydrocarbon therein to produce more of said hot hydrogen and hydrocarbon reducing gas having negligible CO, $CO_2$, and $H_2O$ content which is passed into said subsequent reducing zone.

5. A process of reducing finely divided FeO in stages, which comprises contacting the finely divided FeO admixed with Fe in a fluidized solids mixture having an O/Fe atomic ratio in the range of 0.8 to 0.2 with a hot reducing gas stream of mainly hydrocarbon and hydrogen in a reducing zone wherein some of FeO is reduced, passing a portion of said solids mixture in which some of the FeO is reduced to Fe to a succeeding reduction zone stage in which a lower proportion of FeO is present with Fe particles, reducing FeO particles in said succeeding reduction zone stage by CO in a hot reducing gas stream containing CO as its main reducing component to heat and reduce an additional amount of the FeO particles therein, passing a portion of fluidized solids mixture from said succeeding reduction zone stage to a subsequent reduction zone stage in which a fluidized solids mixture of Fe particles with less FeO particles is established, and further reducing FeO particles in said subsequent zone by hot hydrogen gas passed into contact therewith substantially free of CO, $CO_2$, and $H_2O$.

6. A process as defined in claim 5, wherein the solids mixture of FeO and Fe in said succeeding reduction zone stage in which CO is the main reducing component has an O/Fe atom ratio in the range of 0.5 to 0.1.

7. A process as defined in claim 5, wherein partially spent reducing gas containing CO, $H_2$, $CO_2$, and $H_2O$ is passed from the reducing zones in which CO and hydrocarbon gas are present as main reducing gas components and said partially spent reducing gas is used in a preliminary reducing zone for reducing finely divided $Fe_2O_3$ to FeO that is admixed with finely divided Fe particles to form said fluidized solids mixture having an O/Fe atomic ratio in the range of 0.8 to 0.2.

8. A process for reducing finely divided iron oxide particles from which combined oxygen is removed by reaction with separately added streams of reducing gases in stages to form mixtures of ferrous oxide particles and reduced Fe metal particles, said ferrous oxide particles having been formed in an initial stage of $Fe_2O_3$ reduction by partially spent reducing gases including CO and $H_2$ from subsequent stages, which comprises contacting ferrous oxide particles in an intermediate stage of reduction with a higher temperature hot reducing gas stream containing CO as a predominant reducing agent component to accomplish part of the reduction to a point at which ferrous oxide is partly reduced to Fe metal particles and to impart heat to the particles thus contacted in the intermediate stage, and thereafter in a subsequent stage contacting a resulting mixture of thus heated ferrous oxide and Fe metal particles from said intermediate stage with a hot gas stream rich in hydrocarbon and hydrogen as predominant reducing agent components for converting said ferrous oxide to Fe metal.

9. A process for reducing iron ore oxide particles to FeO and Fe particle mixtures in stages with separate reducing gas streams supplied at each stage following an initial $Fe_2O_3$ particle reduction stage in which $Fe_3O_4$ particles are formed, which comprises reducing $Fe_3O_4$ particles in a mixture of particles having an O/Fe atomic ratio in the range of about 1.3 to 0.8 by passing into contact therewith a hot reducing gas stream in which CO is the predominant reducing component and which imparts heat to the mixture of particles, contacting thus heated and partly reduced iron oxide particles containing $Fe_3O_4$ and FeO particles in a subsequent stage with a hot reducing gas stream of which hydrocarbon and hydrogen are predominant reducing components and in which a mixture of Fe-FeO particles having an O/Fe atomic ratio in the range of about 0.8 to 0.3 is formed.

10. A process as defined in claim 9 wherein Fe-FeO particles from said subsequent stage are contacted with reducing gas which is predominantly hydrogen with negligible amounts of CO and $CO_2$ in a final stage for further reduction of FeO to Fe and $H_2O$ formed in this further reduction is separated from unreacted hydrogen removed from the final stage then recycled to said final stage freed of $H_2O$.

References Cited in the file of this patent
UNITED STATES PATENTS

| | | |
|---|---|---|
| 2,282,144 | Fahrenwald | May 5, 1942 |
| 2,481,217 | Hemminger | Sept. 6, 1949 |
| 2,547,685 | Brassert et al. | Apr. 3, 1951 |
| 2,638,414 | Lewis | May 12, 1953 |
| 2,690,960 | Herbst | Oct. 5, 1954 |
| 2,711,368 | Lewis | June 21, 1955 |
| 2,752,234 | Shipley | June 26, 1956 |
| 2,864,688 | Reed | Dec. 16, 1958 |

OTHER REFERENCES

Jenkins: Controlled Atmospheres for the Heat Treatment of Metals (1946), Chapman & Hall, Ltd., London, pp. 201–208. (Pages 207 and 208 relied on.)